(12) United States Patent
Na

(10) Patent No.: US 8,049,818 B2
(45) Date of Patent: Nov. 1, 2011

(54) VIDEO PROCESSING APPARATUS AND METHOD

(75) Inventor: Jeong-Shan Na, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1315 days.

(21) Appl. No.: 11/455,887

(22) Filed: Jun. 20, 2006

(65) Prior Publication Data

US 2007/0024749 A1  Feb. 1, 2007

(30) Foreign Application Priority Data

Jul. 26, 2005  (KR) .............................. 2005-0068032

(51) Int. Cl.
*H04N 7/00* (2011.01)
*H04N 11/00* (2006.01)
*H03L 7/00* (2006.01)
*H04N 5/46* (2006.01)

(52) U.S. Cl. ........ 348/488; 348/465; 348/467; 348/486; 348/549; 348/555; 348/557; 348/558

(58) Field of Classification Search .................. 348/465, 348/467, 486, 488, 536, 549, 555, 557, 558
See application file for complete search history.

(56) References Cited

U.S. PATENT DOCUMENTS

| | | | | |
|---|---|---|---|---|
| 4,847,676 A | | 7/1989 | Oliphant | |
| 5,579,056 A | * | 11/1996 | Chang | 348/555 |
| 5,774,188 A | * | 6/1998 | Ngo et al. | 348/558 |
| 5,784,117 A | * | 7/1998 | Mitarai et al. | 348/558 |
| 5,835,157 A | * | 11/1998 | Miyazaki et al. | 348/558 |
| 6,052,152 A | * | 4/2000 | Malcolm et al. | 348/537 |
| 6,130,721 A | * | 10/2000 | Yoo et al. | 348/558 |
| 6,157,739 A | * | 12/2000 | Yazawa et al. | 382/233 |
| 6,384,867 B1 | * | 5/2002 | Seino et al. | 348/558 |
| 6,441,860 B1 | * | 8/2002 | Yamaguchi et al. | 348/555 |
| 6,545,725 B1 | * | 4/2003 | Fujita et al. | 348/604 |
| 6,767,621 B2 | * | 7/2004 | Flick et al. | 428/306.6 |
| 7,430,017 B2 | * | 9/2008 | Lee | 348/558 |
| 7,626,636 B2 | * | 12/2009 | Suzuki | 348/558 |
| 2005/0206787 A1 | * | 9/2005 | Lee | 348/558 |
| 2006/0077298 A1 | * | 4/2006 | Gotanda et al. | 348/558 |
| 2006/0103761 A1 | * | 5/2006 | Park | 348/558 |
| 2006/0132646 A1 | * | 6/2006 | Komatsu | 348/441 |

(Continued)

FOREIGN PATENT DOCUMENTS

CN  88102682 A  11/1988

(Continued)

*Primary Examiner* — Brian Yenke
(74) *Attorney, Agent, or Firm* — Roylance, Abrams, Berdo & Goodman, L.L.P.

(57) ABSTRACT

The present invention relates to a video processing method and apparatus capable of performing a proper video process corresponding to various color systems. A decoder extracts color information from a received video signal including vertical synchronous information for a vertical scanning frequency of a picture, color information of the picture, and frequency information corresponding to the color information. A frequency evaluator evaluates the received vertical scanning frequency and the received frequency of the video signal color information on the basis of the vertical synchronous information and the frequency information of the color information. A controller controls the decoder to extract the color information on the basis of the frequency of the color information when the received vertical scanning frequency and the received frequency of the color information evaluated by the frequency evaluator are identical with predetermined vertical scanning frequency and the predetermined frequencies of the corresponding color information.

14 Claims, 4 Drawing Sheets

U.S. PATENT DOCUMENTS

2006/0238651 A1* 10/2006 Suzuki .......................... 348/558

FOREIGN PATENT DOCUMENTS

| | | |
|---|---|---|
| CN | 1237068 A | 12/1999 |
| JP | 08-340548 | 12/1996 |
| KR | 1991-003647 | 2/1991 |
| KR | 1996-0009658 | 3/1996 |
| KR | 1997-0004193 | 3/1997 |
| KR | 20-0131199 | 12/1998 |
| KR | 1999-0054239 | 7/2000 |
| WO | WO 2004107746 A1 | 12/2004 |

* cited by examiner

VIDEO PROCESSING APPARATUS AND METHOD

PRIORITY

This application claims the benefit under 35 U.S.C. §119 (a) of Korean Patent Application No. 2005-0068032, filed Jul. 26, 2005, in the Korean Intellectual Property Office, the entire disclosure of which is hereby incorporated by reference.

BACKGROUND OF THE INVENTION

1. Field of the Invention

The present invention relates to a video processing method and apparatus. More particularly, the present invention relates to a video processing method and apparatus capable of performing a proper video process corresponding to multiple color systems.

2. Description of the Related Art

A video display apparatus, such as a television (TV), receives a video signal corresponding to an image transmitted from such sources as a digital TV broadcast and cable TV broadcast. A video display apparatus can also receive a video signal from various video devices such as a video cassette recorder (VCR) and a digital versatile disc (DVD) player. Further, video display apparatuses can process received video signals and display images accordingly.

A video processing apparatus includes a tuner to set a channel that a user wants to view. The tuner selects/receives a signal corresponding to a frequency assigned to the set channel, in other words the tuned channel. Also, the video processing apparatus includes a decoder which decodes signals corresponding to information about picture and sound, among others, from the received video signal. Since the signal selected and decoded by the video processing apparatus is based on international standards, the video processing apparatus is configured to process the signal on the basis of such international standards. The international standards include those standards such as national television system committee (NTSC), phase alternating line (PAL), Sequential couleur a memoire (SECAM), among others. Thus, the video processing apparatus is set to decode a signal according to at least one of the international standards.

For example, in the case of an NTSC-M standard, the field frequency is 59.72 Hz, the line frequency is 15.734266 KHz, and the color subcarrier frequency is 3.579545 MHz. Therefore, in a video processing apparatus receiving a signal based on the NTSC-M standard, when the received signal has a field frequency of 59.52 Hz, the decoding process is performed with the line frequency and the color subcarrier frequency established as preset 15.734266 KHz and 3.579545 MHz, respectively. Further, in the video processing apparatus receiving a signal based on a PAL-B/G/I standard, the decoding process is performed with a field frequency, line frequency and color subcarrier frequency established as 50 Hz, 15.625 KHz and 4.4336187 MHz, respectively. Thus, a conventional video processing apparatus identifies the field frequency of the received signal, then performs the decoding process on the basis of the preset line frequency and preset color subcarrier frequency corresponding to the identified field frequency.

Users often want a video processing apparatus to properly process signals based on a number of standards. For example, the video processing apparatus may be connected to a DVD player, a game system, or the like, and receive a signal therefrom and output a video signal and an audio signal. However, when the signal outputted from the DVD player, the game system, or the like, is not the same as the signal standard that the corresponding video processing apparatus is configured to accommodate, the video processing apparatus cannot provide proper video and audio signals.

For example, when a signal outputted from a game system is based on the NTSC-N standard, the signal has a field frequency of 50 Hz, but its line frequency and color subcarrier frequency are 15.625 KHz and 3.579545 MHz, respectively. Because the field frequency of the video processing apparatus receiving an NTSC-M standard signal is set to 60 Hz, the video processing apparatus cannot properly decode the signal outputted from such a video device. Meanwhile, in the case where the video processing apparatus is set to receive a PAL-B/G/I standard signal, the video processing apparatus determines that the input signal is based on the PAL-B/G/I standard because the input signal has a field frequency of 50 Hz. Thus, the video processing apparatus for the PAL-B/G/I standard tries to apply the decoding process to the input signal by regarding the corresponding line frequency and corresponding color subcarrier frequency as 15.625 KHz and 4.4336187 MHz, respectively. However, the real color subcarrier frequency of the input signal is not compatible with the preset color subcarrier frequency of the video processing apparatus. Thus, the video processing apparatus cannot correctly extract color information from the input signal and as a result incompletely displays the image.

SUMMARY OF THE INVENTION

Accordingly, it is an aspect of the present invention to provide a video processing method and apparatus capable of performing a proper video process corresponding to multiple color systems. Additional aspects and advantages of the present invention will be set forth in certain exemplary embodiments of the detailed description which follows.

The foregoing and other aspects of the present invention can be achieved by providing a video processing apparatus comprising a decoder to extract color information from a video signal that comprises vertical synchronous information for a received vertical scanning frequency of a picture, color information of the picture, and frequency information corresponding to a received frequency of the color information. The video processing apparatus further comprises a frequency storage device to store at least one predetermined vertical scanning frequency and at least one predetermined frequency of the color information corresponding thereto, a frequency evaluator to evaluate the received vertical scanning frequency and the received frequency of the color information of the video signal on the basis of vertical synchronous information and the frequency information of the color information, and a controller to control the decoder to extract color information on the basis of the frequency of the color information when the received vertical scanning frequency and the received frequency of the color information evaluated by the frequency evaluator are identical with the predetermined vertical scanning frequency and the predetermined frequency of the corresponding color information stored in the frequency storage device.

According to another exemplary embodiment of the present invention, a video processing apparatus for a video signal comprising horizontal synchronous information for a received horizontal scanning frequency of a picture is provided. The video processing apparatus comprises a frequency storage device for storing at least one predetermined horizontal scanning frequency corresponding to the predetermined vertical scanning frequency, a frequency evaluator for evaluating the received horizontal scanning frequency of the video signal on the basis of the horizontal synchronous information, and a controller for controlling the decoder to extract the color information when the received horizontal scanning frequency evaluated by the frequency evaluator is identical with the predetermined horizontal scanning frequency stored in the frequency storage device.

The foregoing and other aspects of the present invention can be achieved by providing a video processing method comprising storing at least one predetermined vertical scanning frequency of a picture and at least one predetermined frequency of color information corresponding thereto in memory. The method further comprises evaluating a received vertical scanning frequency of a picture and a received frequency of color information of a video signal comprising vertical synchronous information for the received vertical scanning frequency and the color information of the picture, and frequency information of the color information on the basis of the vertical synchronous information and the frequency information. The method still further comprises extracting color information on the basis of a frequency of corresponding color information when the evaluated received vertical scanning frequency and the evaluated frequency of the color information are identical with the predetermined vertical scanning frequency and the predetermined frequency of the corresponding color information stored in memory.

According to another exemplary embodiment of the present invention, a processing method for a video signal comprising horizontal synchronous information for a received horizontal scanning frequency of a picture is provided. The video processing method comprises storing at least one predetermined horizontal scanning frequency corresponding to the predetermined vertical scanning frequency in a memory, and evaluating the received horizontal scanning frequency of the video signal on the basis of the horizontal synchronous information, wherein extracting color information comprises extracting the color information when the evaluated received horizontal scanning frequency is identical with the predetermined horizontal scanning frequency stored in the memory.

BRIEF DESCRIPTION OF THE DRAWINGS

The above and other aspects and exemplary advantages of the present invention will become more apparent and more readily appreciated from the following description of certain exemplary embodiments, taken in conjunction with the accompany drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
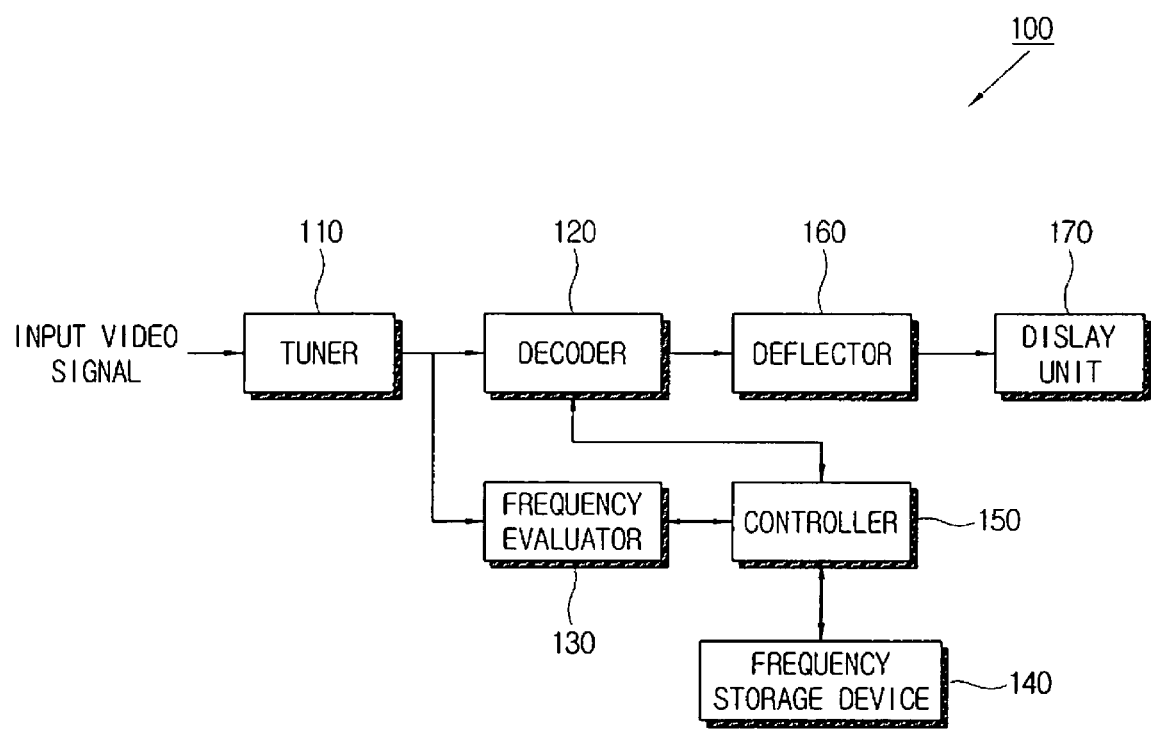
FIG. 1 is a schematic block diagram showing a configuration of a video processing apparatus according to an exemplary embodiment of the present invention.

FIG. 1 is a schematic block diagram showing a configuration of a video processing apparatus according to an exemplary embodiment of the present invention. A video processing apparatus 100 according to exemplary embodiments of the present invention can be utilized by a TV system or the like. The video processing apparatus 100 receives a video signal corresponding to an image from an airwave TV broadcast, a cable TV broadcast, or the like, or receives a video signal from multiple video devices such as a VCR or the like. Further, the video display apparatus processes the received video signal and displays a corresponding image. In particular, the display apparatus 100 can store information about video signals corresponding to various standards and evaluate the characteristics of an input signal, thereby properly processing the signal.

As shown in FIG. 1, the video processing apparatus 100 comprises a tuner 110, a decoder 120, a frequency evaluator 130, a frequency storage device 140, a controller 150, a deflector 160, and a display unit 170. The tuner 110 receives a signal corresponding to a channel selected by a user with regard to an airwave TV broadcast signal or the like, and receives a signal corresponding to a frequency assigned to the tuned channel according to a standard. In this exemplary embodiment, the signal received through the tuner 110 is based on an NTSC standard. Meanwhile, when the video processing apparatus 100 is connected to a video device, such as a VCR, and receives a video signal therefrom, the tuner 110 is not necessary.

The decoder 120 receives the signal selected by the tuner 110, and extracts information about an image from the received signal. In an exemplary embodiment of the present invention, the video signal includes brightness information about the intensity of an image, chrominance information about the color of an image, and horizontal and vertical synchronous information for properly displaying an image by pixels on a two-dimensional array. The decoder 120 extracts brightness information and chrominance information from the video signal according to control from the controller 150.

Figure 2A:
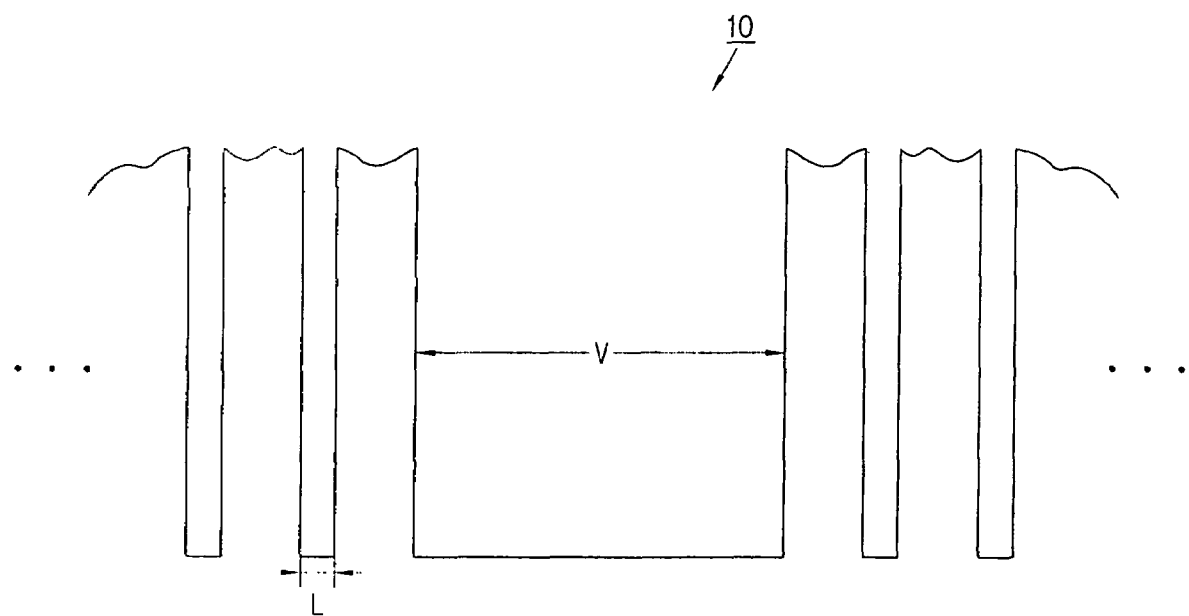
FIG. 2 is a view showing a waveform of a video signal according to an exemplary embodiment of the present invention.

The frequency evaluator 130 receives the signal selected by the tuner 110, evaluates the frequency of the received signal, and outputs an evaluation result to the controller 150. Further, the frequency evaluator 130 obtains a field frequency from the vertical synchronous information on the basis of a level of an input video signal 10. FIG. 2A shows a waveform of the video signal 10 to be inputted to the frequency evaluator 130 according to an exemplary embodiment of the present invention. As shown in FIG. 2A, the frequency evaluator 130 detects a vertical blanking interval "V" representing the vertical synchronous information of the video signal 10, and obtains the field frequency on the basis of the number of vertical blanking intervals with respect to a period of time. Here, the field frequency is described by way of an example of a vertical scanning frequency according to an exemplary embodiment of the present invention.

Further, the frequency evaluator 130 obtains a line frequency from the horizontal synchronous information on the basis of the level of the input video signal 10. As shown in FIG. 2A, the frequency evaluator 130 detects a line blanking interval "L," representing the horizontal synchronous information of the video signal 10, and obtains the line frequency on the basis of the number of vertical blanking intervals with respect to a period of time. Here, the line frequency is described by way of an example of a horizontal scanning frequency according to an exemplary embodiment of the present invention.

Figure 2B:
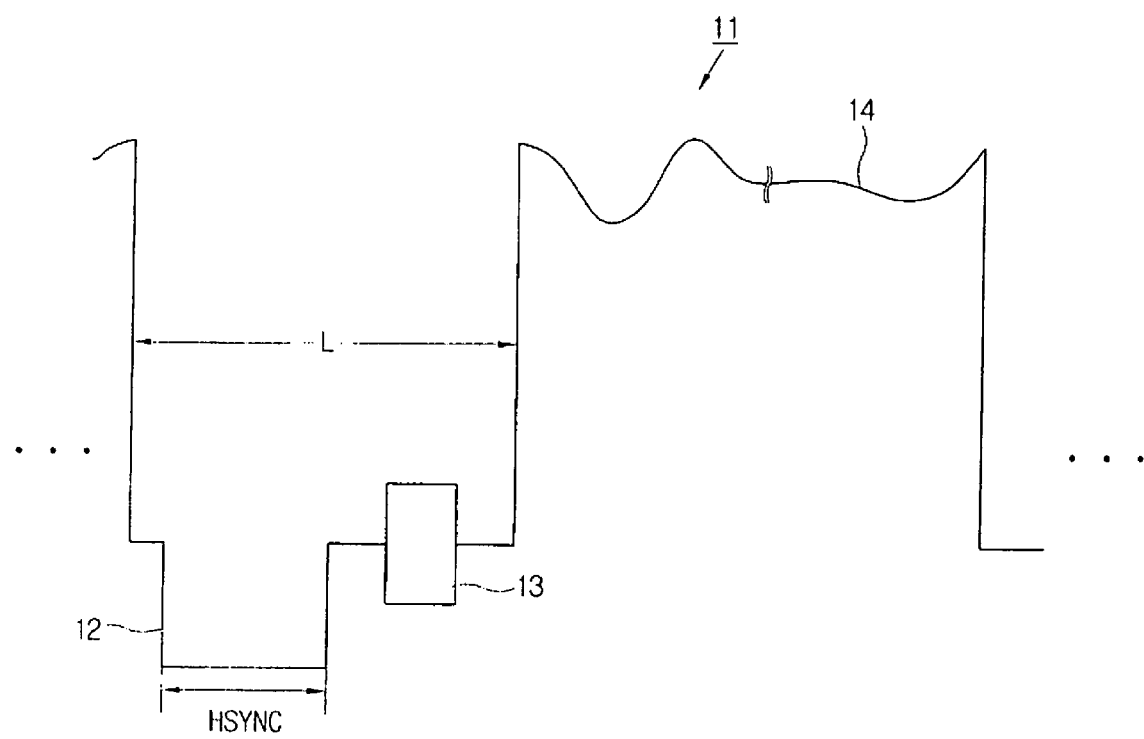

In this exemplary embodiment, the video signal comprises a color subcarrier as frequency information needed for extracting color information. The frequency evaluator 130 detects the color subcarrier from the input video signal 10 and evaluates its frequency. FIG. 2B shows a partial waveform of the video signal 10 corresponding to one line 11 to be inputted to the frequency evaluator 130 according to an exemplary embodiment of the present embodiment. The frequency evaluator 130 detects a color subcarrier 13, for example, a sine wave signal, following the horizontal synchronous signal Hsync 12 within the line blanking interval "L" at the beginning of line 11, and obtains the frequency of the detected color subcarrier 13. In FIG. 2B, "14" indicates a partial signal containing brightness information and color information. In this exemplary embodiment, the color subcarrier frequency is described by way of an example of a color information frequency according to an exemplary embodiment of the present invention.

The frequency storage device 140 stores predetermined information about field frequency, line frequency, and the color subcarrier frequency of the video signal to be processed in the video processing apparatus 100. Here, the frequency storage device 140 can store various predetermined field frequencies, various line frequencies and various color subcarrier frequencies, thereby allowing the video processing apparatus 100 to process various video signal corresponding to various standards. In an exemplary embodiment of the present invention, the frequency storage device 140 stores predetermined information about the field frequency, line frequency, and the color subcarrier frequency of each video signal based on an NTSC-M standard and an NTSC-N standard. For example, the frequency storage device 140 stores predetermined information comprising a field frequency of 59.52 Hz, a line frequency of 15.734266 KHz and a color subcarrier frequency of 3.579545 MHz for the NTSC-M standard, and stores predetermined information comprising a field frequency of 50 Hz, a line frequency of 15.625 KHz and a color subcarrier frequency of 3.579545 MHz for the NTSC-N standard.

When frequency information of the video signal evaluated by the frequency evaluator 130 is identical with the predetermined frequency information stored in the frequency storage device 140, the controller 150 sets a color system with these frequencies and controls the decoder 120 to decode the video signal on the basis of the set color system. The controller 150 receives the field frequency, the line frequency and the color subcarrier frequency of the Video signal evaluated by the frequency evaluator 130, and determines whether these frequencies of the video signal are identical with the corresponding predetermined frequencies stored in the frequency storage device 140, thereby setting the color system.

As a result of the evaluation of the frequency evaluator 130, when two field frequencies are identical with each other and two color subcarrier frequencies are identical with each other, the controller 150 controls the decoder 120 to perform a decoding process on the basis of the corresponding color subcarrier frequency As a result of the evaluation of the frequency evaluator 130, when two field frequencies are identical with each other but two line frequencies are not identical with each other, the controller 150 determines that there is no signal. When two field frequencies are identical with each other and two line frequencies are identical with each other, but two color subcarrier frequencies are not identical with each other, the controller 150 determines that there is no color system.

In this exemplary embodiment, the controller 150 may be realized by a software program executed by a microprocessor such as a central processing unit (CPU). The software program may be stored in memory, such as read only memory (ROM). The software program can be programmed by a language to implement the controller 150, for example, a microprocessor to perform the foregoing operation.

The deflector 160 performs a deflection process on the basis of the vertical synchronous frequency and the horizontal synchronous frequency of a picture obtained by the decoding process of the decoder 120, thereby displaying the picture on the display unit 170. The display unit 170 receives the signal deflection processed by the deflector 160, and displays a picture corresponding to the received signal. Here, the display unit 170 may be realized by a cathode ray tube (CRT) and the like.

According to the present exemplary embodiment, even though the field frequency is identical with the predetermined field frequency stored in the frequency storage device, when the line frequency is not identical with the predetermined line frequency stored in the frequency storage device, the decoding process is not performed and the video process is not applied against the standards. Further, the identification of the color subcarrier frequency as well as that of the field frequency is determined so that a decoding error is prevented in the color system of which the field frequencies are identical with each other but the color subcarrier frequencies are different from each other.

Figure 3:
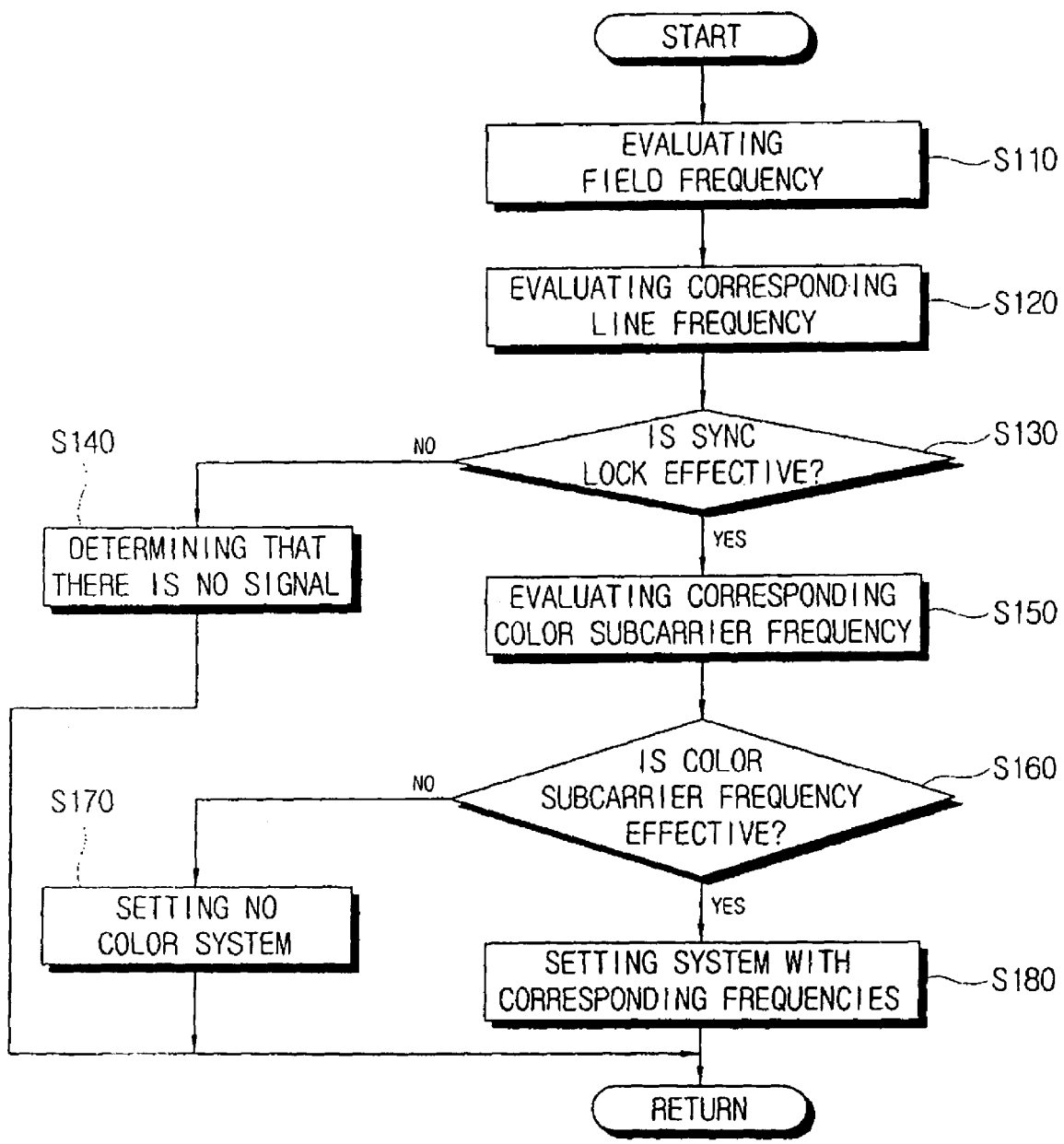
FIG. 3 is a schematic flowchart showing an operation of the video processing apparatus according to an exemplary embodiment of the present invention.

FIG. 3 is a schematic flowchart showing an operation of the video processing apparatus according to an exemplary embodiment of the present invention. First, the video processing apparatus 100 allows the memory to store a predetermined field frequency, line frequency and color subcarrier frequency, which are needed for decoding the video signal to be received and correspond to the color system of the received video signal. At step S110, the video processing apparatus 100 evaluates the field frequency of the received video signal.

At step S120, the video processing apparatus 100 determines whether the evaluated field frequency is identical to the predetermined field frequency stored in the frequency storage device, and evaluates the line frequency of the received video signal when there is an identical field frequency. As a result of the evaluation, it is then determined whether the sync lock is effective, step S130. When the horizontal synchronous signal is not found or is not identical with the stored line frequency related to the field frequency, that is, when a sync lock is ineffective, even though the line frequency of the video signal is obtained, the video processing apparatus 100 determines that there is no received video signal and does not apply the decoding process to the video signal, step S140.

When the sync lock is found effective at step S130, the video processing apparatus 100 evaluates the color subcarrier frequency of the received video signal, step S150. As a result of the evaluation, it is then determined whether the color subcarrier frequency is effective, step S160. When the color subcarrier frequency is not obtained or when it is not identical with the stored, predetermined color subcarrier frequency related to the field frequency, that is, when the color subcarrier frequency is ineffective, even though the color subcarrier frequency is obtained, the video processing apparatus 100 determines that there is no color system, step S170, and does not apply the decoding process to the video signal.

At step S160, when the color subcarrier frequency obtained as the result of the evaluation is identical with the stored, predetermined color subcarrier frequency related to the field frequency, the color system is set with the corresponding field frequency, the corresponding line frequency and the corresponding color subcarrier frequency, step S180, so that the decoding process is performed on the basis of these frequencies.

As described above, exemplary embodiments of the present invention provide a video processing method and apparatus capable of performing a proper video process corresponding to various color systems.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A video processing apparatus comprising:
    a decoder to extract color information from a video signal comprising vertical synchronous information for a vertical scanning frequency of a picture, color information of the picture, and frequency information corresponding to the color information of the video signal;
    a frequency storage device to store the vertical scanning frequency and a frequency of the color information corresponding thereto;
    a frequency evaluator to evaluate the vertical scanning frequency and the frequency of the color information of the video signal on the basis of the stored vertical synchronous information and the stored frequency information of the color information; and
    a controller to control the decoder to extract the color information on the basis of the frequency of the color information when the vertical scanning frequency and the frequency of the color information evaluated by the frequency evaluator are identical with the vertical scanning frequency and the frequency of the corresponding color information stored in the frequency storage device, and to determine that the video signal does not have a color system when the received frequency of the color information is not identical with the predetermined frequency of the corresponding color information stored in the frequency storage device.

2. The video processing apparatus according to claim 1, wherein the video signal comprises horizontal synchronous information for a horizontal scanning frequency of the picture;
    the frequency storage device is configured to store the horizontal scanning frequency corresponding to the vertical scanning frequency;
    the frequency evaluator is configured to evaluate the horizontal scanning frequency of the video signal on the basis of the horizontal synchronous information; and
    the controller is configured to control the decoder to extract the color information when the horizontal scanning frequency evaluated by the frequency evaluator is identical to the horizontal scanning frequency stored in the frequency storage device.

3. The video processing apparatus according to claim 1, wherein the frequency evaluator is configured to obtain a field frequency from the vertical synchronous information on the basis of a level of the video signal.

4. The video processing apparatus according to claim 3, wherein the received vertical scanning frequency comprises a field frequency.

5. The video processing apparatus according to claim 1, wherein the video signal comprises a color subcarrier as frequency information for extracting chrominance information.

6. The video processing apparatus according to claim 5, wherein the frequency evaluator is configured to detect the color subcarrier following a horizontal synchronous signal within a line blanking interval.

7. The video processing apparatus according to claim 1, further comprising a deflector for performing a deflection process on the basis of a vertical synchronous frequency and a horizontal synchronous frequency of the picture obtained from the decoder.

8. A video processing method comprising:
    storing a vertical scanning frequency of a picture and a frequency of color information corresponding thereto in memory;
    evaluating the vertical scanning frequency and the frequency of the color information of a video signal on the basis of the frequency of the color information and vertical synchronous information, the video signal comprising the vertical synchronous information for the vertical scanning frequency of the picture, color information of the picture, and the frequency of the color information;
    extracting the color information on the basis of the frequency of corresponding color information when the evaluated vertical scanning frequency and the evaluated frequency of the color information are identical with the vertical scanning frequency and the frequency of the corresponding color information stored in the memory; and
    determining that the video signal does not have a color system when the received frequency of the color information is not identical with the predetermined frequency of the corresponding color information stored in the frequency storage device.

9. The video processing method according to claim 8, wherein the video signal comprises horizontal synchronous information for a horizontal scanning frequency of a picture, and
    the video processing method further comprising:
    storing the horizontal scanning frequency corresponding to the vertical scanning frequency in the memory; and
    evaluating the horizontal scanning frequency of the video signal on the basis of the horizontal synchronous information,
    wherein the extracting the color information comprises extracting the color information when the evaluated horizontal scanning frequency is identical to the horizontal scanning frequency stored in the memory.

10. The video processing method according to claim 8, wherein the frequency evaluation obtains a field frequency from the vertical synchronous information on the basis of a level of the video signal.

11. The video processing method according to claim 10, wherein the received vertical scanning frequency comprises a field frequency.

12. The video processing method according to claim 8, wherein the video signal comprises a color subcarrier as frequency information for extracting chrominance information.

13. The video processing method according to claim 12, wherein the frequency evaluation detects the color subcarrier following a horizontal synchronous signal within a line blanking interval.

14. The video processing method according to claim 8, the method further comprising:

deflecting the video signal on the basis of a vertical synchronous frequency and a horizontal synchronous frequency of the picture.

* * * * *